May 27, 1930.　　　　　H. G. ROSS　　　　　1,760,608
FOOTBALL GAME INDICATING ADVERTISING NOVELTY
Filed Nov. 2, 1929
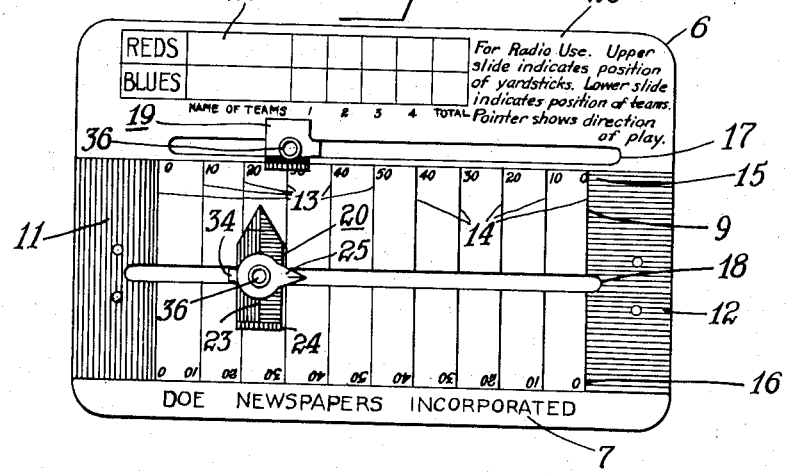
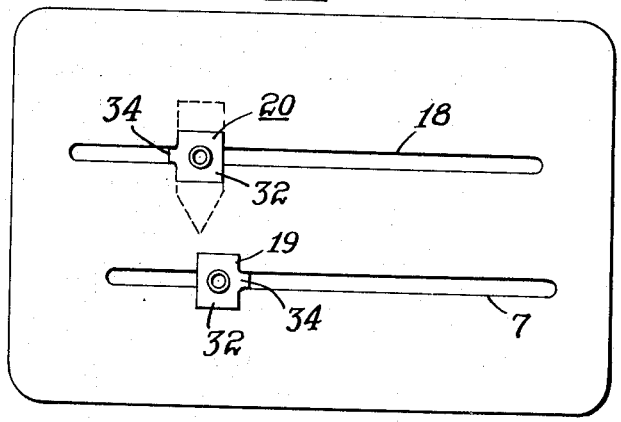
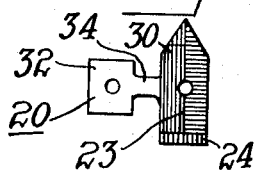 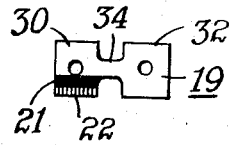 
INVENTOR
Hugh G. Ross
By O. B. Buchanan Patented May 27, 1930

1,760,608

UNITED STATES PATENT OFFICE

HUGH G. ROSS, OF WILKINSBURG, PENNSYLVANIA

FOOTBALL-GAME-INDICATING ADVERTISING NOVELTY

Application filed November 2, 1929. Serial No. 404,301.

My invention relates to an advertising novelty in the shape of a football game-indicator for use in reproducing or visualizing a football game while a description of it is being received by radio.

The object of my invention is to produce a small card, made of celluloid or other light, stiff material, having game-indicating means thereon, and adapted to be manufactured in large numbers at trifling expense so that it can be given away as an advertisement.

The characteristic features of my football game-indicating advertising novelty will best be understood by reference to the accompanying drawing, wherein Fig. 1 is a plan view of my device in a preferred form, Fig. 2 is a bottom view thereof, Figs. 3 and 4 are plan views of the blanks from which the two slides are made, and Fig. 5 is a plan view of the pointer.

My invention comprises a small card 6, made of celluloid or other light, stiff material, preferably of a size convenient for the vest pocket or purse, and bearing advertising matter 7 including the name of the newspaper, radio or cigarette company, or the like, which is giving the cards away.

The card has a representation of a football field thereon, as indicated at 9, comprising a rectangular field on a suitably reduced scale, ruled at 10-yard intervals, and having red and blue home fields 11 and 12 at the ends thereof. Preferably half of the 10-yard lines are red, as indicated at 13, and half are blue, as indicated by the heavier lines at 14. A row of yard-indicating numerals is disposed along each side of the field, one of said rows being right-side up, as at 15, and the other being upside down, as at 16, so that the card may be turned upside down when the teams change ends, if the user of the device cares to make this distinction, although ordinarily it is to be expected that the device will remain right-side up throughout the game.

The card has a pair of closed, parallel, lengthwise extending slots 17 and 18, therein, the lower slot 18 being disposed centrally of the football field 9, and the upper slot 17 being disposed alongside of said field. Two frictionally-held slides 19 and 20 are provided, to wit: an upper slide 19 movable in the upper slot 17 for indicating the position of the yardsticks, and a lower slide 2 movable in the lower slot 18 for indicating the position of the teams. The upper slide 19 has a 10-yard marker 21 thereon, preferably with 1-yard graduations 22. The lower slide 20 has indicia 23 thereon for indicating the teams, having a central vertical line thereon, and/or having one half red and the other blue, and/or having dots thereon representing men. The lower slide may also have 1-yard graduations 24. The lower slide also has a pointer 25 thereon to indicate the direction of play, whether toward the right or toward the left.

The card preferably bears instructions 26 indicating its use, and has a permanently ruled space 27 for the names of the teams and the box score. The space 27 has a surface which is sufficiently rough to receive pencil writing, and preferably, though not necessarily, the entire surface of the card is of the same degree of roughness or lack of polish.

Each of the slides 19 and 20 has a front portion 30, wider than the slot 17 or 18, and a back portion 32, also wider than the slot. The front and back portions 30 and 32 of each slide are connected, at one side, by an integral neck 34 extending through its slot and having a width only slightly less than the slot. The front and back portions 30 and 32 are permanently clipped together by an eyelet 36 extending through the same at a point removed from the neck 34 and having a sliding fit in the slot. In this way, the slides 19 and 20 are supported against rotation. The eyelet 36 of the lower slide 20 also retains and pivotally supports the pointer 25.

It will be noted from Fig. 1 that the upper slot 17 extends further to the right than the lower slot 18 and that the latter exends further to the left than the former. Also, the neck-portion 34 of the upper slide 19 is disposed on its right side, whereas the neck-portion 34 of the lower slide 20 is disposed on its left side. The reason for this construction is to enable each of the slides to traverse the entire length of the field without having the material composing either of the home fields 11 or 12 unduly weakened by having both slots extending thereinto, it being noted that the slot-end adjacent to the neck 34 must extend beyond the end of the field 9 in order to admit of the necessary extent of movement of the slide.

While I have shown my invention in a preferred form of embodiment comprising a number of parts in combination, it will be understood that a smaller or larger number of parts or indicia or indicators, with various changes in details, may be utilized without departing from the essential spirit and scope of my invention. I desire, therefore, that the appended claims be given the broadest interpretation consistent with their language and the prior art.

I claim as my invention:

1. An advertising novelty comprising a card having, in addition to advertising matter thereon, a representation of a football field thereon, a closed, lengthwise slot therein, a slide movable in said slot for indicating the position of the teams, and a pointer for indicating the direction of play.

2. An advertising novelty comprising a card having, in addition to advertising matter thereon, a representation of a football field thereon, a closed, lengthwise slot therein, and a slide movable in said slot, said slide comprising a transversely extending front portion extending above and below the slot, said slide also comprising a back portion larger than the width of said slot, said front and back portions being connected, at one side, by an integral neck extending through said slot and having a sliding fit therein, and an eyelet extending through said front and back portions at a point removed from said neck and also having a sliding fit in said slot.

3. An advertising novelty comprising a card having, in addition to advertising matter thereon, a representation of a foot ball field thereon, a closed, lengthwise slot therein, and a slide movable in said slot for indicating the position of the teams, said slide comprising a transversely extending front portion extending above and below the slot and having indicia thereon for indicating the teams, said slide also comprising a back portion larger than the width of said slot, said front and back portions being connected, at one side, by an integral neck extending through said slot and having a sliding fit therein, and an eyelet extending through said front and back portions at a point removed from said neck and also having a sliding fit in said slot.

4. An advertising novelty comprising a card having, in addition to advertising matter thereon, a represention of a football field thereon, a closed, lengthwise slot therein, a slide movable in said slot for indicating the position of the teams, said slide comprising a transversely extending front portion extending above and below the slot and having indicia thereon for indicating the teams, said slide also comprising a back portion larger than the width of said slot, said front and back portions being connected, at one side, by an integral neck extending through said slot and having a sliding fit therein, and an eyelet extending through said front and back portions at a point removed from said neck and also having a sliding fit in said slot, and a pointer secured by said eyelet on the front face of said slide for indicating the direction of play.

5. A football game indicator comprising a card having a representation of a football field thereon, a pair of closed, parallel, lengthwise slots therein, one of said slots being disposed centrally of the field and the other being disposed alongside of said field, a slide movable in each of said slots, and a pointer for indicating the direction of play.

6. A football game indicator comprising a card having a representation of a football field thereon, a pair of closed, parallel, lengthwise slots therein, one of said slots being disposed centrally of the field and the other being disposed alongside of said field, and a slide movable in each of said slots, each of said slides comprising a transversely extending front portion extending above and below its slot, each of said slides also comprising a back portion larger than the width of its slot, said front and back portions being connected, at one side, by an integral neck extending through said slot and having a sliding fit therein, and an eyelet extending through said front and back portions at a point removed from said neck and also having a sliding fit in said slot.

7. The invention as set forth in claim 6, characterized by the fact that one of said slots extends further to the right than the other, and the last-mentioned slot extends further to the left than the other, the slide which is movable in the right-extending slot having its neck portion disposed to the right, and the slide which is movable in the left-extending slot having its neck portion disposed to the left.

8. The invention as set forth in claim 1, characterized by the fact that said card has a portion of its surface susceptible of receiving pencil-writing and permanently ruled to provide spaces for the box score.

9. The invention as set forth in claim 4, characterized by the fact that said card has a portion of its surface susceptible of receiving pencil-writing and permanently ruled to provide spaces for the box score.

10. A football game indicator comprising a card havng a representaton of a football field thereon, a pair of closed, parallel, lengthwise slots therein, one of said slots being disposed centrally of the field and the other being disposed alongside of said field, and a slide movable in each of said slots, characterized by the fact that said card has a portion of its surface susceptible of receiving pencil-writing and permanently ruled to provide spaces for the box score.

11. The invention as set forth in claim 5, characterized by the fact that said card has a portion of its surface susceptible of receiving pencil-writing and permanently ruled to provide spaces for the box score.

12. The invention as set forth in claim 1, characterized by the fact that said card has a row of yard numbers along each side of the field, one of said rows being right-side up and the other being upside down.

13. The invention as set forth in claim 4, characterized by the fact that said card has a row of yard numbers along each side of the field, one of said rows being right-side up and the other being upside down.

14. A football game indicator comprising a card having a representation of a football field thereon, a pair of closed, parallel, lengthwise slots therein, one of said slots being disposed centrally of the field and the other being disposed alongside of said field, and a slide movable in each of said slots, characterized by the fact that said card has a row of yard numbers along each side of the field, one of said rows being right-side up and the other being upside down.

15. The invention as set forth in claim 5, characterized by the fact that said card has a row of yard numbers along each side of the field, one of said rows being right-side up and the other being upside down.

16. The invention as set forth in claim 1, characterized by the fact that the home fields and the respective halves of the football field are distinctively colored.

17. The invention as set forth in claim 4, characterized by the fact that the home fields and the respective halves of the football field are distinctively colored.

18. A football game indicator comprising a card having a representation of a football field thereon, a pair of closed, parallel, lengthwise slots therein, one of said slots being disposed centrally of the field and the other being disposed alongside of said field, and a slide movable in each of said slots, characterized by the fact that the home fields and the respective halves of the football field are distinctively colored.

19. The invention as set forth in claim 5, characterized by the fact that the home fields and the respective halves of the football field are distinctively colored.

In testimony whereof, I have hereunto subscribed my name this first day of November, 1929.

HUGH G. ROSS.